United States Patent
Frey, Jr. et al.

[11] 3,723,937
[45] Mar. 27, 1973

[54] PRECISION POTENTIOMETER WITH INDICATOR

[75] Inventors: Sydney W. Frey, Jr., Upland; Donald L. Gaa; Robert W. Tetamore, both of Riverside, all of Calif.

[73] Assignee: Bourns, Inc., Riverside, Calif.

[22] Filed: Oct. 26, 1971

[21] Appl. No.: 192,119

[52] U.S. Cl. ..................338/143, 338/163, 338/164, 338/184
[51] Int. Cl. .............................................H01c 5/00
[58] Field of Search......338/143, 141, 298, 196, 199, 338/163, 162, 164, 180, 184

[56] References Cited
UNITED STATES PATENTS

| R25,674 | 11/1964 | Hardison et al. | 338/143 |
| 1,760,057 | 5/1930 | Hawley | 338/298 |
| 2,936,436 | 5/1960 | Roberts | 338/141 |

Primary Examiner—Richard B. Wilkinson
Assistant Examiner—U. Weldon
Attorney—William G. Becker

[57] ABSTRACT

A simplified rotary precision potentiometer of improved accuracy with indicator for indicating the setting of the movable contact, the indicator not requiring setting or phasing with the contact after assembly, and the indicator accurately indicating the low (zero), maximum (high) and intermediate settings, and with the resistance element an exact multiple of 360 degrees between its electrical ends.

9 Claims, 12 Drawing Figures

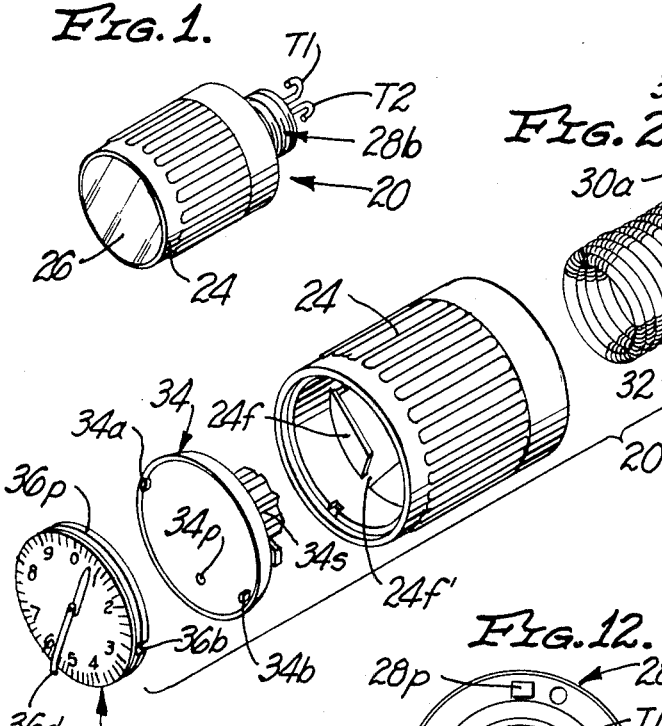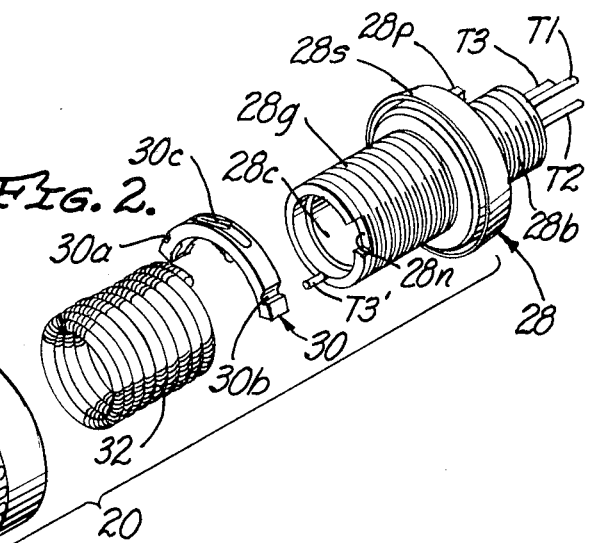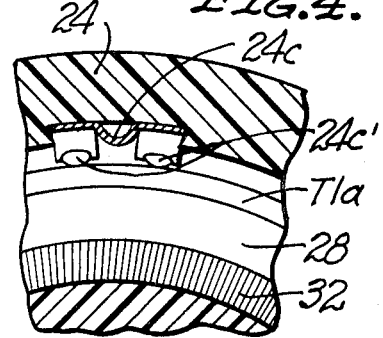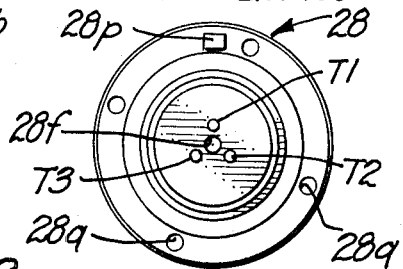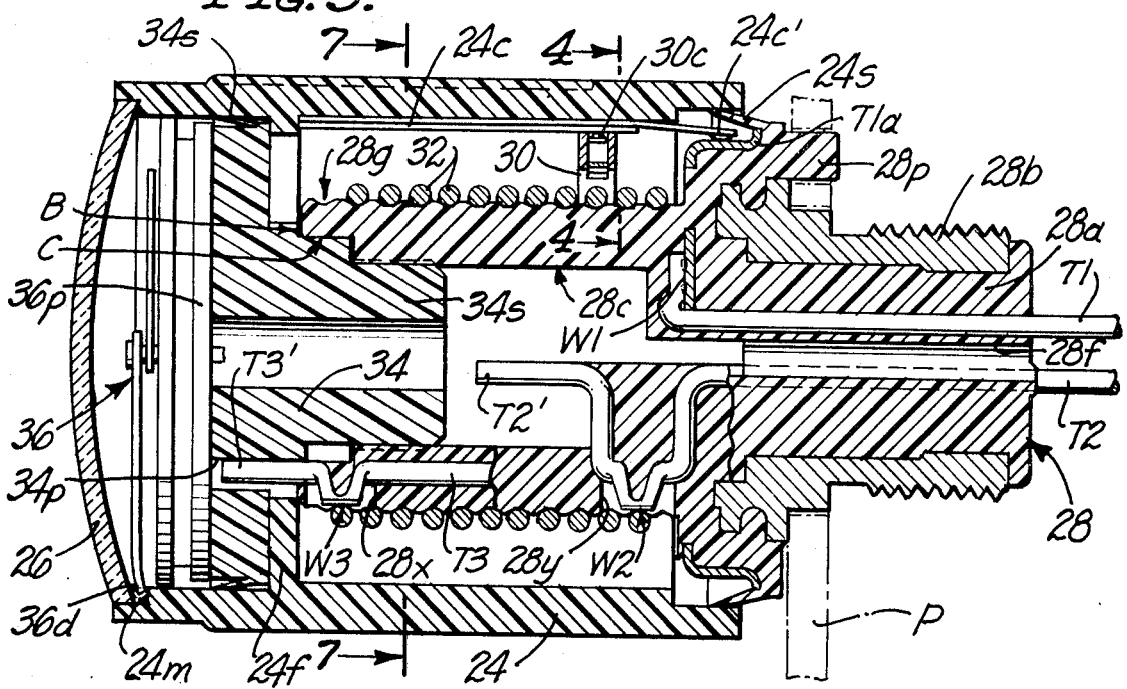

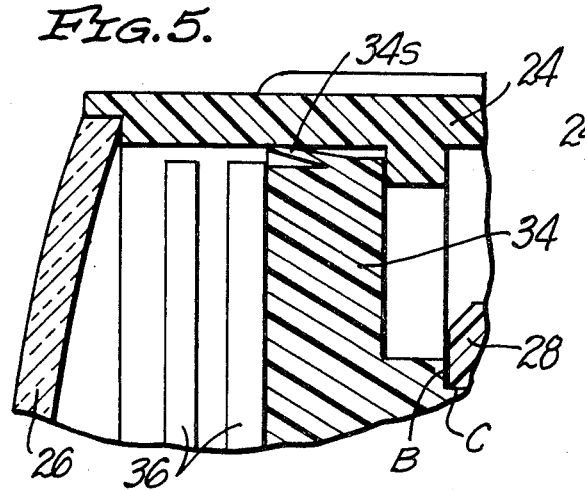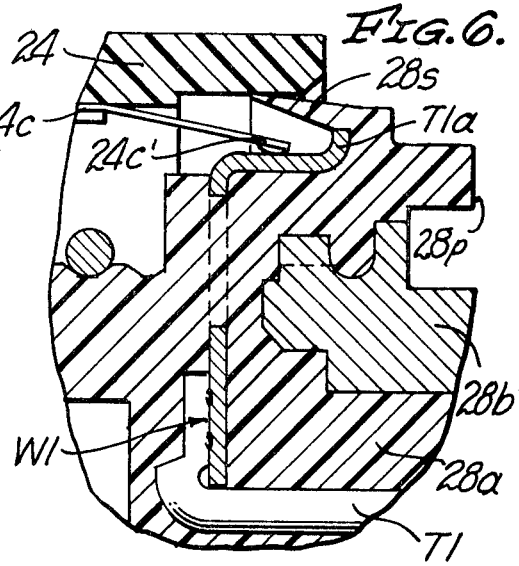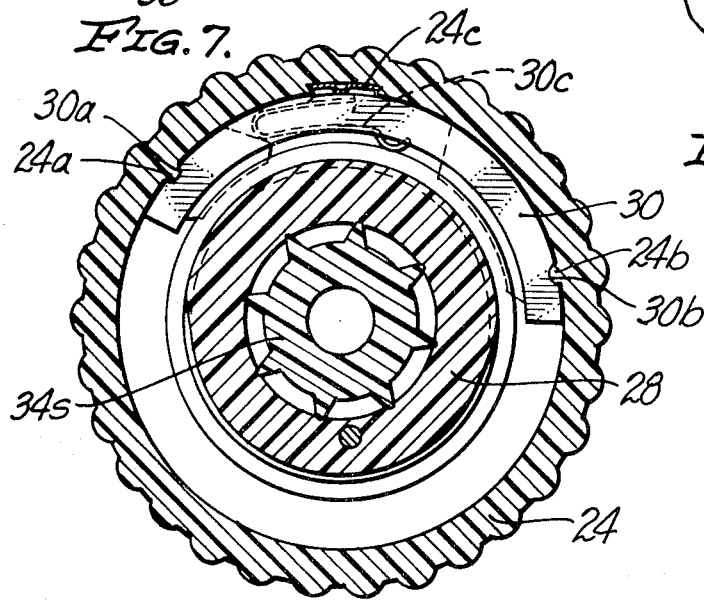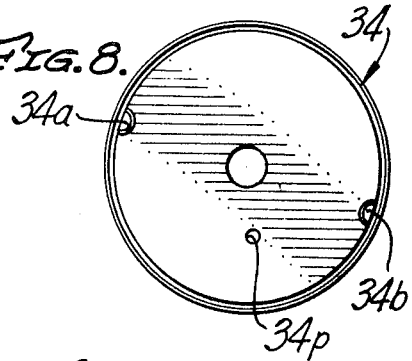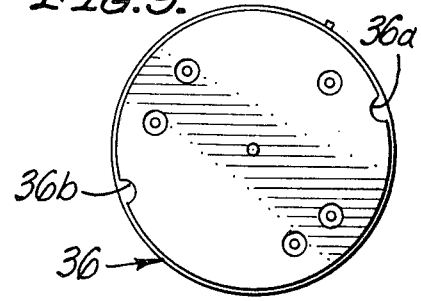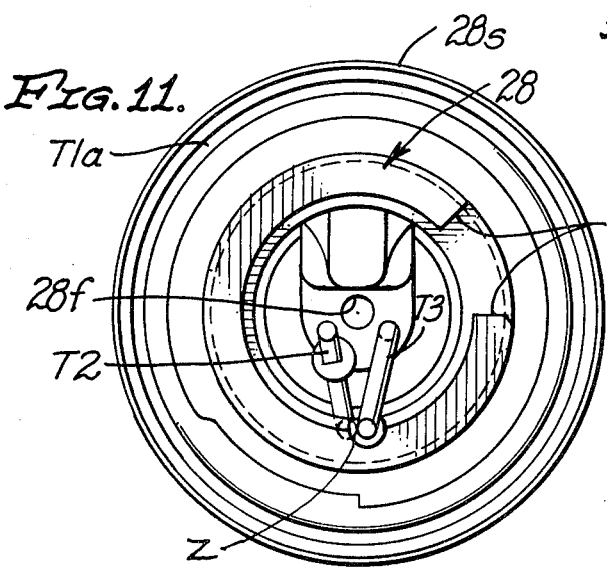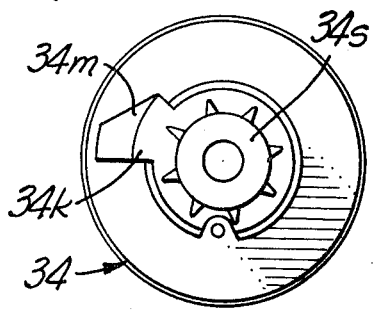

PRECISION POTENTIOMETER WITH INDICATOR

CROSS-REFERENCE TO RELATED APPLICATION

In respect of certain details of construction herein disclosed, this disclosure is related to a concurrently filed disclosure of Sydney W. Frey, Jr., and Robert W. Gaines, application Ser. No. 192,118 filed 10/26/71, entitled POTENTIOMETER TERMINATIONS AND METHOD.

BRIEF SUMMARY OF THE INVENTION

The prior art

In U.S. Pat. Nos. Re. 25,674 and 3,134,086 there is disclosed a type of precision multi-turn potentiometer and clock-face indicator dial, in combination. Therein a rotatable shell serves concurrently as an enclosure or housing in which operating electrical and mechanical components of the potentiometer are housed, and as an actuating member which when rotated in the manner of a knob, effects movement of a slider and contact along the extent of a helical resistance element that is supported upon a hollow stud. The stud or support comprises a bushing means by which the potentiometer is adapted for mounting in an aperture in a panel; and the support serves also as a conduit through which conductors extend from behind the panel to ends of the resistance element and to a bus or return connection to the movable contact. The support has mounted on its forward end a clock-type indicator for presenting a visual indication of the extent of displacement of the movable contact of the potentiometer from the "low potential" or zero position. While the organization and construction of the components was satisfactory and the invention attained notorious commercial success, there were several inherent undesirable features. For example, connecting terminal lead wires to the ends of the resistance element, and connecting the leads to terminal members was difficult and tedious and did not provide an optimum degree of accuracy in the placement or location of the electrical ends of the resistance element. Also, setting or "phasing" of the indicator relative to an electrical end of the element was necessary and constituted a time-consuming operation. Further, potting of wires was a necessary operation, and a nuisance and time-consuming. Also, a large number of parts were required.

The present invention

By several novel means and procedures, the present invention overcomes the noted objectionable features of the prior art potentiometers and concurrently simplifies and improves the accuracy of the potentiometer and indicator. The central support is formed by a molding operation in which terminal members are "molded-in" or partially embedded in the support with free ends extending outwardly from the bushing and with specially-formed inner ends extending inwardly and accurately positioned for direct fusion-union, e.g., by silver brazing, with the resistance element and with one directly attached to a collector ring conductor that is also embedded in the support during the molding operation. Thus the tedious manual welding of wires and potting of the wires are avoided. By means of special key means comprised in the support means and indicator means the latter becomes self-phased, i.e., automatically positioned and correctly registered, during ordinary assembly of the indicator to the potentiometer proper; and thus, manual manipulations previously required to bring the indicator into registry with the operating components of the instrument have been avoided. The stationary support means, comprised principally of two molded members that are united into a unitary body, is so formed as to provide integral seal devices for sealing the interior of the housing against ingress of foreign material, thus eliminating necessity for providing and installing O-ring seals or like seals. The indicator means is accurately keyed to the support means by molded key means, and similarly that part of the support upon which the indicator is mounted is accurately positioned relative to the molded-in terminal means; and since the electrical ends of the resistance element are precisely located by ends of the accurately positioned molded-in terminals, the indicator is automatically phased with the contact by merely positioning the contact and the indicator at zero positions prior to assembly of the operating parts. As noted, the support is molded about a collector ring and terminal, with a plurality of removable pins holding the ring in position. The mold is formed with an internal screw thread whereby the support has formed thereon an external screw thread adapted to receive the convolutions of a helical resistance element. Following withdrawal of the ring-positioning pins, the holes left thereby are utilized with a complementary wrench for unscrewing the threaded support from the molding die; thus the support is formed without parting-line ridges or flash which require removal to provide a smooth helical seat for the helical element. As in the prior art construction, the rotatable shell is rotatable on surfaces of the support and carries a return bus bar or strip, and drives a contact carrier along the helical element. The contact device carried by the carrier brushes on the bus strip, and the bus strip brushes on the collector ring that is embedded in the support with one of the terminal conductors. Further the indicator clockwork is actuated by the fast hand thereof engaging in a driving notch or recess formed in the shell. The contact carrier, as in the prior art, is guided along the helical element by fins that engage opposite sides of a convolution of the element and ride or travel in the inter-convolution space or groove of the thread formed by the turns of the element.

The preceding summary makes it evident that it is a principal object of the invention to provide general improvements in knob-enclosed precision potentiometers. Another object of the invention is to provide improvements in methods of producing precision potentiometers comprising turn indicators for indicating position of a contact means along an element. Another object of the invention is to provide improvements in sealing means for rotary potentiometer enclosures. An additional object of the invention is to provide a simplified potentiometer of the multi-turn type. A further objective of the invention is to effect economies in manufacture of multi-turn potentiometers. Another object of the invention is to provide seal means integral with relatively-movable housing means, which seal means have the ability to flex and assume a line-to-line fit and concurrently provide a slight resistance to applied force or torque so as to effectively restrain the parts against undesired movement due to vibration or the like, and which seal means accommodate differences in dimensions of parts due to manufacturing dimensional tolerances. Other objects and advantages of the invention will hereinafter be set out or made evident in the following detailed description and appended claims.

The description is of the preferred potentiometer and method of making the same and has reference to the accompanying drawings forming a part of this specification.

DESCRIPTION OF THE DRAWINGS

FIG. 1 is a pictorial view, to no particular scale, of the preferred form of potentiometer according to the invention;

FIG. 2 is an exploded view of the potentiometer depicted in FIG. 1, to a larger scale, showing details of certain components, with a lens removed;

FIG. 3 is an enlarged longitudinal sectional view showing internal construction details of the potentiometer depicted in FIG. 1, with some portions broken away to better show terminal means;

FIG. 4 is an enlarged fragmentary sectional view, the sectioning being as indicated by directors 4—4 in FIG. 3;

FIGS. 5 and 6 are fragmentary sectional views to enlarged scale, showing details of front and rear sealing arrangements and modes, and illustrating connections between a return bus and a terminal;

FIG. 7 is a transverse sectional view with sectioning as indicated by the directors 7—7 in FIG. 3;

FIG. 8 is a front face view of the forward stationary support member used in the exemplary potentiometer;

FIG. 9 is a rear face view of the indicator clockwork of the potentiometer;

FIG. 10 is a rear face view of the forward support member depicted in FIG. 8;

FIG. 11 is a front face view of the rear support member comprised in the potentiometer to enlarge scale; and FIG. 12 is a rear face view of the rear support member to an arbitrary scale.

DETAILED DESCRIPTION OF THE EXEMPLARY POTENTIOMETER AND PROCEDURE ACCORDING TO THE INVENTION

Viewed as a whole and externally, as depicted in FIG. 1, the exemplary potentiometer 20 presents an appearance very similar to the potentiometer described in the aforementioned U.S. Pat. No. Re. 25,674. It comprises a rearwardly-extending bushing portion 28b by means of which the potentiometer is adapted to be mounted in known manner in an aperture in a panel or the like such as that indicated in phantom at P in FIG. 3. Thus the principal or main portion of the potentiometer is disposed forwardly from the front face of the mounting panel. The operating electrical components of the instrument are contained within a rotatable generally cylindrical shell 24 which is closed at its forward end by a transparent lens or cover 26.

The principal subassembly components of the potentiometer are displayed in the array depicted in FIG. 2. Therein, 28 denotes a rear support subassembly, 30 denotes a contact-carrier assembly, 32 denotes a resistance element, 24 the noted shell which in addition to serving as a principal housing member to enclose and protect the enclosed components also serves as a manually-rotatable actuator or "knob" by means of which the electrical setting of the potentiometer is changed. A front support member is denoted by 34, and an indicator clockwork assembly by 36.

The clockwork assembly 36 may be, except as hereinafter noted, substantially the same as that disclosed in U.S. Pat. No. 3,134,086, and hence is not herein described in complete detail. The general scheme of construction and assembly of the juxtaposed subassemblies and parts is shown in FIG. 3, wherein it is noted that the rear support subassembly (herein termed the rear support) comprises a metal bushing 28b fixed in an elongate shaped support body 28a formed of thermoplastic insulation. The rearward portion of body 28a is molded about, and thus firmly fixes in determined juxtaposition, a set of thermal conductors, here designated terminals T1, T2 and T3 (FIG. 11). It further has partly embedded therein a conductive collector ring T1a (FIGS. 3 and 6) to which the inner end of terminal T1 is welded as indicated at W1 in FIG. 6. The forward portion of support body 28a is hollow, and its exterior formed with a shallow helical thread presenting a helical groove 28g into which the helical resistance element 32 is turned and seated. The interior bore 28c of the forward portion of body 28a is cylindrical, and receives with a heavy force fit the rear longitudinally-fluted stub 34a of front support member 34 as indicated in FIGS. 3 and 7. The force fit is such that elastic and physical deformation of the flutes of stub 34s maintains the parts firmly in position during further assembly and inspection procedures, yet permits disassembly if that becomes desirable. Thus the outside diameter of the flutes or ribs is slightly greater than the inside diameter of the bore 28c, to provide the force fit.

The extreme forward end T3' of terminal T3 (FIG. 3) protrudes from support body 28a, to facilitate establishment of a connection for passing a welding current through the terminal. Member 34 is formed with a clearance aperture 34p for reception of end T3' of the terminal as stub 34s is pressed home in bore 28c, although it will be understood that end T3' may be sheared off following welding T3 to the resistance element 32 at W3, and that aperture 34p may in that case be omitted. The rear end front support members 28 and 34 are formed with complementary interfitting cylindrical surfaces that upon assembly come into close engagement, as indicated at C in FIG. 3, whereby the two support members are brought into accurate coaxial alignment. Accurate angular positioning of member 34 relative to member 28 is effected by provision of a key 34k (FIG. 10) on a rear face of member 34, which key is received in a complementary notch recess 28n (FIGS. 2 and 11) formed in the forward end of member 28. Forced entry of the reduced diameter rear end of front support member 34 into rear support member 28 is completed when complementary arcuate radial faces of the two members are brought into contact, as indicated at B in FIG. 3.

Disposed between rotatable shell 24 and the forward cylindrical portion of support member 28 is a contact carrier 30. The contact carrier, as shown in FIG. 2, is formed with notches 30a and 30b adjacent its outer extremities which are complementary to respective longitudinally extending inwardly projecting rails 24a, 24b (FIG. 7) formed on the inner surface of shell 24. Thus the contact carrier is permitted longitudinal translation along the interior of shell 24, and is constrained to rotate with the shell. Carrier 30 is substantially like its counterpart, slider 26, shown and described in the aforementioned U.S. Pat. No. Re. 24,674, excepting that the double-limbed contact 30c is adhesively secured at the apex of its V-form to the carrier proper rather than being secured in place by a pin. Further, the carrier 30 is formed with inwardly-extending fins which extend into the groove between convolutions of the helical resistance element 32 and which fins thus force the carrier to translate axially along rails 24a and 24b as the carrier is rotated by the shell as the potentiometer is actuated. The outer end of the inner limb of the generally V-shaped resilient contact 30c is deformed by bending or cupping to provide a contact point that is oriented to ride on the crest of the resistance element 32. The end of the outer limb of the contact 30c is furcated to provide a pair of independently-movable contact fingers whose contact points resiliently bear upon a collector bus 24c (FIGS. 3 and 7) that is mounted in a longitudinally extending dovetail groove formed in the interior wall of shell 24. Thus as the carrier 30 is translated longitudinally along its guiding rails by the screw-thread action of the resistance element during rotation of the shell, the contact 30c electrically connects the bus 24c with successive points of contact along the resistance element. Both shell 24 and carrier 30 are formed of insulation, whereby electric isolation of the contact is assured. At its rearward end the bus 24c is furcated and tine-ends are cupped to form a set of brushes 24c' (FIGS. 4 and 6) that brush on the collector terminal ring T1a as indicated in FIGS. 3, 4 and 6.

On its forward face the stationary front support member 34 is provided with spaced forwardly-extending lugs 34a and 34b (FIGS. 2 and 8) that are disposed for seating in complementary notches 36a and 36b (FIG. 9) formed in the base plate of the indicator means 36. Thus the indicator means is accurately keyed to the support means. The precise placement of terminals T2 and T3 in the support member 28 permits precise location of the electrical ends of the resistance element at welds W2 and W3 (FIG. 3) as is fully explained in the above mentioned copending application Ser. No. 192,118, to which reference may be made if necessary. As indicated in FIG. 11, the weld locations of terminals T2 and T3 are on opposite sides of, but common to, a line Z parallel to the axis of the element 32, whereby each turn or convolution of the element is traversed by exactly 360° of rotation of the contact carrier. Thus with the contact carrier initially disposed with its inner contact directly over weld W3 during assembly, and with the tip end 36d of the partial-turns hand of indicator 36 disposed in the driving notch 24m of shell 24, and the hands of the indicator at the "zero" position on the indicator dial, the indicator is automatically phased with the element-brushing contact on contact carrier 30. Thus tedious phasing of the indicator with the contact, which was required in the prior art construction, is avoided with the present improved construction. Details of the indicator means and mode of driving the same by connection to the knob or shell 24 are fully explained in the aforementioned U.S. Pat. Nos. 3,134,086 and Re. 25,674.

Assembly of the potentiometer components into a complete potentiometer involves but a few operations. Prior to being embedded in the insulation of which the body of support member 28 is composed, terminal T1 is welded to collector ring T1a at weld W1. The three terminal members, with ring T1a spot-welded to terminal T1 at weld W1, together with bushing 28a, are placed in a multiple-piece mold, and insulative material such as glass-filled nylon in injected into the mold and hardened about the inserts. Thus a molded subassembly comprising metal bushing 28b, terminals T1, T2 and T3, and ring T1a is produced in the mold. That subassembly is depicted as a unit at the right end of the array shown in FIG. 2.

There is produced during the molding operation, a rearwardly-projecting rotation-inhibiting lug or pin 28p (FIGS. 3 and 6) that is adapted to fit into a supplementary hole or aperture in the mounting panel P and orient the potentiometer in proper attitude and restrain the latter against axial rotation in the mounting aperture. Also formed during the molding of member 28 is a thin forwardly-extending lip 28s which as indicated in FIG. 6 forms a flexible seal and bearing integral with the rear support member and upon which the rear end of rotatable shell 24 bears with a sliding and sealing fit. During molding of support member 28, a series of spaced positioning pin members of the mold press against ring T1a and thus hold the latter terminal member against an inner face of the mold. Withdrawal of the noted pin members leaves the rear support member 28 with a series of rearwardly-facing holes such as 28q (FIG. 12). Those holes provide means for engagement of the support member by a rotary spanner wrench that is rotated to unscrew the threaded forward end of the support member from the mold. Thus a smooth and substantially perfect helical seat or groove 28g is provided on the support member for subsequent reception and accurate seating of the helical resistance element.

Further during the molding of rear support member 28 a centrally disposed pin in the mold serves to form a small longitudinal bore 28f (FIGS. 3, 11 and 12) through the support member. The bore is employed for introduction of adhesive into the interior cavity of the support via an hypodermic or like needle, following final electrical testing of the potentiometer. Thus it is evident that if during electrical testing a defect is discovered, the assembled parts or components may then be disassembled and parts replaced and the instrument re-assembled, prior to final cementing of the parts.

Further, following completion of molding of rear support member 28 and its entrained terminal means, small pads of silver solder or like solder or brazing metal are welded or fused to the flat seats formed on terminals T2 and T3, at the locations of welds W2 and W3, respectively, as indicated in FIG. 3. As indicated in the latter drawing, the rear support member 28 is formed with transverse apertures 28x, 28y, at the weld locations to permit application of the brazing metal and keep plastic clear of the weld. The pads are dropped into the respective apertures and onto the respective terminals, electrode means are inserted and pressure applied, ground connections made to the protruding ends of the terminals, and a surge of current passed through the pads (successively or concurrently, as preferred), to fuse the brazing metal to the terminals at the respective weld locations W2 and W3.

After the solder or brazing-metal pads are fused onto the respective terminals as described, the helical resistance element 32 is turned onto the thread of the support member 28 and disposed with its two ends extending past the weld or fusion locations W2 and W3. The element, which is of the wirewound type, thus has its electrical ends disposed in contact with respective ones of the solder or brazing-metal pads. The physical ends of the element extend considerably past the weld points, to provide extensions of the guiding means for the contact carrier. The element is formed with its convolutions slightly undersized, whereby when it is turned into place on the support it firmly grips the latter. The terminals T2 and T3 are specially deformed adjacent the weld locations W2 and W3, respectively, to provide thereat a somewhat reduced cross-section. Thus following seating of the resistance element, a surge of heating current is passed through each of the terminals T2 and T3, causing the reduced sections thereof to reach the fusion temperature of the brazing-metal pads and resulting in the fusion-uniting of the resistance wire of the element, and the terminal, in each instance. The brazing or soldering thus performed to effect fusion-uniting of the two components, may be facilitated by application of flux in a manner known in the art. The protruding inner ends T2' and T3' of terminals T2 and T3 facilitate making the necessary electrical connections for applying the heating current; and thereafter either or both of the protruding ends may be sheared off. A bore 34p (FIG. 3) may, as shown, be provided in the front support member 34 to receive the protruding end T3' of terminal T3 in the event the latter is not removed following completion of weld W3.

The outer rotatable shell 24, which serves as a principal housing member, and the furcated return bus 24c, form a subassembly. As noted, in assembling the potentiometer, bus 24c is inserted in a dovetail slot, and preferably is retained in place therein by means of projections (not shown) extending upward on each edge of the bus and engaging edges of the lips of the dovetail. Other obvious means may be used to assure fixation of the bus, e.g., adhesive. The contact carrier 30 is placed in the open rear end of the shell 24 and snapped in place on rails 24a and 24b, with the outer contacts of contact 30c engaging the return bus 24c. Then the rear support subassembly with the resistance element unit complete and in place is partially inserted into the shell, and the first (forwardmost) convolution of the element brought into seating relationship between the fins of the contact-carrier. Thereafter with the resistance element pressing against the contact-carrier, the rear support member, element and contact carrier are pressed forwardly into shell 24 until an inwardly-extending flange 24f (FIGS. 2 and 3) formed in shell 24 seats against the forward end of the rear support member 28a. Thereafter the forward support member 34 is pressed into place in the shell and rear support member, with key 34k (FIG. 10) and integral stop abutment 34m aligned to enter slot 24f' (FIG. 2) in the flange 24f. Front support member 34 is molded with an annular lip seal 34s (FIGS. 3 and 5) similar to that formed on the rear support member; and similarly the lip seal 34s serves as a bearing and internal seal upon which shell 24 is rotatable and bears. Thus as the front support member is pressed home, lip seal 34s engages the smooth cylindrical forward inner wall of the shell, and the forward flange of the support member is seated against the forward end of the rear support member as indicated at B in FIG. 3.

The rear plate 36p of the indicator means 36 is next pressed into place and adhesively fixed to the front support member 34, the central bore of the latter receiving the projecting spindle of the indicator means as depicted in FIG. 3. As the indicator means is pressed home with notches 36a and 36b (FIG. 9) aligned with projections 34a and 34b (FIG. 8), care is exercised that the outer end 36d of the outer (fast) hand of the indicator seats in recess 24m of shell 24, as indicated in FIG. 3. Thereafter, lens 26 is adhesively secured in place in a peripheral seat or recess in shell 24 as indicated in FIG. 3.

It is noted that the rotatable knob-like shell 24 is held captive in operating position by flange 24f which rides between the rear face of the flange of front support member 34 and the front face of the rear support member 28. The rearwardly-extending terminals T1, T2 and T3 may be bent into hook form to form hook terminals as indicated in FIG. 1. Following completion of the assembling of subassemblies as described, insulative self-curing cement is introduced through bore 28f (FIG. 3) into the interior cavity, thus firmly securing the stationary supporting means together in proper juxtaposition.

The foregoing detailed description and explanation of a presently-preferred embodiment and mode according to the invention indicates complete attainment of the noted objects.

We claim:

1. A multi-turn potentiometer comprising:
   first means, including stationary support means for supporting the potentiometer forwardly of a panel and including an insulation support member for extending through an aperture in such panel;
   second means, including first, second and third terminal members embedded in said insulation support member for extending electrical terminal connections through such aperture in a panel, and a multi-turn helical resistance element mounted on said support means with its electrical ends connected to the second and third of said terminals;
   third means, including a contact carrier and a contact, movable along said resistance element, and means electrically connecting said contact with the first of said terminal members;
   fourth means, including rotary means, supported by said first means for rotation relative thereto and effective upon being rotated to move said contact carrier and contact along said resistance element;
   a substantial portion of said second and third terminal members being rigidly and accurately held in said embedding insulation support member to accurately and rigidly position resistance element connecting portions thereof contiguous to electrical ends of said resistance element at locations spaced apart by a predetermined amount of angular traverse of said contact; and said rotary means comprising a generally cylindrical shell means enclosing said third means and adapted to engage in sealing arrangement a portion of said stationary support means, said sealing arrangement including a thin, resilient lip seal means integral with said first means, whereby said lip seal means protects said third means from ingress of undesired foreign material.

2. A potentiometer as defined in claim 1, comprising an indicator mounted on an end of said stationary support means remote from the panel end thereof, said indicator having a part driven by said generally cylindrical shell.

3. A potentiometer as in claim 2 further including means for accurately keying said indicator to said first means so that said indicator is accurately positioned relative to said resistance element connecting portions of said second and third terminal members.

4. A potentiometer as defined in claim 1, in which said resistance element is of helical form arranged along a helix about an axis, and in which said second and third terminal members have connection to electrical ends of said element from respective opposite sides of a line parallel to said axis and intersecting said helix, whereby terminations of said element at the electrical ends thereof are precisely positioned.

5. A potentiometer as defined in claim 1, in which said first terminal member comprises a ring device embedded in part in said support means in coaxial relationship with said helical resistance element and arranged to be brushed by part of said means electrically connecting said contact with the first of said terminal members.

6. A multi-turn potentiometer comprising:
first means, including stationary support means shaped and arranged to be mounted adjacent the rear end thereof in an aperture in a panel;
second means, including a helical resistance element, and a plurality of terminal means, supported by said stationary support means;
third means, including a generally cylindrical shell means supported by said support means for rotation about an axis coaxial with said helical resistance element, said first means cooperating with said third means to form an enclosed chamber; and
fourth means, including contact means in said chamber engaging said shell means to be driven thereby and having a contact engaging said resistance element, and means providing a connection from said contact to one of said terminal means;
said first and third means comprising seal and bearing resilient lip means integral with said first means and effective to seal said chamber from ingress of undesired foreign material.

7. A potentiometer as defined in claim 6, in which said stationary support means comprise a rear support member of molded insulation in which intermediate portions of said terminal means are embedded for insulated extension through an aperture in a panel, and a front support member physically united with said rear support member to form a unitary support.

8. A potentiometer as defined in claim 7, including a turns-indicator device secured to the front end of said front support member and having a driven connection with said shell means, whereby the position of said contact means as determined by rotation of said shell means is indicated by said turns-indicator device.

9. A potentiometer as defined in claim 7, wherein said rear support member presents a stepped cylindrical bore at its front end, and in which said front support member presents a complementary stepped cylindrical rear end portion provided with longitudinal flutes effecting a tight drive fit in said bore, whereby following assembly of said support means said potentiometer may be subjected to mechanical and electrical tests and subsequently disassembled if necessary without destruction of parts, for easy replacement of means including said second and third means.

* * * * *

UNITED STATES PATENT OFFICE
CERTIFICATE OF CORRECTION

Patent No. 3,723,937    Dated March 27, 1973

Inventor(s) Sydney W. Frey, Jr., Donald L. Gaa, Robert W. Tetamore

It is certified that error appears in the above-identified patent and that said Letters Patent are hereby corrected as shown below:

Column 2, Line 11, "O-ring seals or" should read --O-ring or--.

Column 4, Line 50, "end" should read --and--.

Signed and sealed this 12th day of November 1974.

(SEAL)
Attest:

McCOY M. GIBSON JR.
Attesting Officer

C. MARSHALL DANN
Commissioner of Patents